United States Patent
Giraud

(10) Patent No.: US 12,491,842 B2
(45) Date of Patent: Dec. 9, 2025

(54) METHOD FOR CLEANING A PROTECTIVE DEVICE FOR A DRIVE ASSIST SYSTEM FOR A MOTOR VEHICLE AND ASSOCIATED DRIVE ASSIST SYSTEM

(71) Applicant: Valeo Systèmes d'Essuyage, Le Mesnil Saint Denis (FR)

(72) Inventor: Frederic Giraud, Le Mesnil Saint Denis (FR)

(73) Assignee: Valeo Systemes d'Essuyage, Bobigny (FR)

( * ) Notice: Subject to any disclaimer, the term of this patent is extended or adjusted under 35 U.S.C. 154(b) by 415 days.

(21) Appl. No.: 17/918,658

(22) PCT Filed: Mar. 22, 2021

(86) PCT No.: PCT/EP2021/057320
§ 371 (c)(1),
(2) Date: Oct. 13, 2022

(87) PCT Pub. No.: WO2021/209229
PCT Pub. Date: Oct. 21, 2021

(65) Prior Publication Data
US 2023/0145395 A1 May 11, 2023

(30) Foreign Application Priority Data
Apr. 13, 2020 (FR) ...................................... 2003684

(51) Int. Cl.
*B60S 1/56* (2006.01)
*B60R 11/04* (2006.01)
(Continued)

(52) U.S. Cl.
CPC . *B60S 1/56* (2013.01); *B60S 1/46* (2013.01); *G02B 27/0006* (2013.01);
(Continued)

(58) Field of Classification Search
None
See application file for complete search history.

(56) References Cited

U.S. PATENT DOCUMENTS

| 8,671,504 B2 | 3/2014 | Ono et al. |
| 9,224,051 B2 | 12/2015 | Irie et al. |

(Continued)

FOREIGN PATENT DOCUMENTS

| CN | 102267419 A | 12/2011 |
| CN | 103529639 A | 1/2014 |

(Continued)

OTHER PUBLICATIONS

China Patent Office, Office Action (with English translation) of corresponding Chinese Patent Application No. 202180034675.6, dated Sep. 4, 2025, 8 pages.

*Primary Examiner* — Ryan Crockett
(74) *Attorney, Agent, or Firm* — Valeo Systemes d'Essuyage

(57) ABSTRACT

The present invention relates to a method for cleaning a protective device (3) for a drive assist system (1), comprising an optical sensor (13) having an optic (14), the protective device (3) having an optical element (9) arranged upstream of the optic (14) and having an inner surface (9a) and an outer surface (9b) and being movably mounted about an axis of rotation (A1), the method comprising the following steps: processing a succession of images acquired by the optical sensor (13) when the optical element (9) is rotating, so as to detect a generally circular or semi-circular shape which is centred on the axis of rotation (A1) of the optical element (9) and which is generated by dirt deposited on the outer surface (9b), and triggering at least one action for cleaning the outer surface (9b) of the optical element (9) if the shape is detected. The invention also relates to an associated drive assist system (1).

12 Claims, 3 Drawing Sheets

(51) Int. Cl.
  *B60S 1/46*      (2006.01)
  *G02B 27/00*     (2006.01)
  *H04N 23/61*     (2023.01)
  *H04N 23/81*     (2023.01)

(52) U.S. Cl.
  CPC ........... *H04N 23/61* (2023.01); *H04N 23/811* (2023.01); *B60R 11/04* (2013.01)

(56) References Cited

U.S. PATENT DOCUMENTS

| | | |
|---|---|---|
| 10,843,668 B2 | 11/2020 | Bretagnol et al. |
| 11,079,592 B2 | 8/2021 | Bretagnol et al. |
| 11,731,588 B2 | 8/2023 | Park et al. |
| 2013/0083317 A1 | 4/2013 | Fujii et al. |
| 2014/0232869 A1* | 8/2014 | May ................. H04N 23/811 |
| | | 348/148 |
| 2017/0244873 A1 | 8/2017 | Izabel et al. |
| 2019/0031147 A1 | 1/2019 | Cheng et al. |
| 2020/0254979 A1* | 8/2020 | Bretagnol .............. G03B 29/00 |

FOREIGN PATENT DOCUMENTS

| | | | |
|---|---|---|---|
| CN | 107856640 A | 3/2018 | |
| CN | 109305103 A | 2/2019 | |
| CN | 109661278 A | 4/2019 | |
| CN | 110167688 A | 8/2019 | |
| CN | 110626312 A | 12/2019 | |
| WO | WO-2020064885 A1 * | 4/2020 | ........... G01S 13/867 |
| WO | WO-2020193304 A1 * | 10/2020 | ............... B08B 1/04 |

\* cited by examiner

METHOD FOR CLEANING A PROTECTIVE DEVICE FOR A DRIVE ASSIST SYSTEM FOR A MOTOR VEHICLE AND ASSOCIATED DRIVE ASSIST SYSTEM

The present invention relates to the field of driver assistance and in particular to the cleaning of driver assist systems installed on some vehicles. The driver assist system can comprise an optical sensor, such as, for example, a camera comprising an objective lens, intended to acquire at least one image, in particular comprising at least one lens, said optical sensor being at least partially housed in a protective device. Furthermore, the present invention also relates to a method for cleaning such a protective device.

Currently, front, rear or even side vision cameras are fitted to a large number of motor vehicles. In particular, they form part of driver assist systems such as parking assist systems or even lane departure warning systems.

Cameras that are installed in the interior of the passenger compartment of a vehicle against the rear windscreen/window and that point backward through the rear windscreen of the vehicle are known. These cameras are well protected from exterior climatic events and grime caused by organic or inorganic pollutants. The field of view of such a camera can be cleaned by a wiper blade sweeping the rear window of the vehicle in order to remove the dirt. However, the angle of view for such cameras, installed in the interior of the passenger compartment, is not optimal, in particular for a parking-assistance system, for example because they do not allow obstacles located in proximity to the rear of the vehicle to be seen.

For this reason, the cameras for driver assist systems are preferably installed on the outside of vehicles at various points depending on the desired use, for example, on the rear or front bumpers, or even on the rear or front license plate of the motor vehicle. In this case, the camera is therefore highly exposed to being spattered with organic or inorganic dirt that may be deposited on its optic and thus decrease its effectiveness, or even make it inoperative. In particular, in rainy weather, dirt spray is observed that can significantly affect the operability of the driver assist system comprising such a camera. The surfaces of the optics of the cameras must therefore be cleaned in order to guarantee they remain in a good operating state. To this end, one or more operations for cleaning the optical sensor can be triggered, such as, for example, spraying a cleaning fluid in order to remove the dirt present in the field of view of the optical sensor.

In order to limit the operations for cleaning such optical sensors, driver assist systems are known from the prior art that have a camera comprising image processing means that can detect the presence of dirt in the field of view of the optical sensor in order to trigger a possible cleaning action when dirt is detected.

However, with such driver assist systems, dirt can only be detected when the vehicle is moving. Indeed, in order to determine whether the shape detected by the optical sensor corresponds to dirt or to a shadow, the vehicle must be moving so that the optical sensor can capture a plurality of images corresponding to various road scenes. The various captured images then need to be compared in order to verify whether the detected shape corresponds to a shadow or to dirt. If the shape is persistent and immobile on the various captured road scenes, this indicates the presence of dirt. Otherwise, this indicates that it was only a shadow. Thus, the method for detecting dirt implemented by such a driver assist system is long and complex. According to another solution, devices for protecting optical sensors are known that comprise an optical element, forming a protective mask, intended to be arranged upstream of the camera optic.

According to one solution of the prior art, the optical element corresponds to a protective glass having vibration means configured to vibrate said glass in order to remove any dirt. However, it has been found that the effectiveness of such a device for stubborn and encrusted dirt may be limited in spite of the vibration of the protective window. Furthermore, such a device has no means for detecting the presence of dirt before the user commands the protective glass to vibrate in order to allow it to be cleaned.

According to another solution of the prior art, this optical element is intended to be rotated by an actuator, so as to remove any dirt by virtue of the centrifugal force associated with the rotation of this optical element. Thus, the optical sensor is protected by the optical element and this optical element is cleaned by the rotation thereof.

However, some dirt can be deposited at points of the optical element where the centrifugal effect is too weak to allow it to be removed. Moreover, stubborn dirt can be deposited on the optical element when it is stationary for a long period of time, for example, and removing it by means of the centrifugal effect can be difficult. However, such a driver assist system does not offer any solution for automatically detecting the presence of such dirt.

The aim of the present invention is to at least partially overcome the aforementioned disadvantages of the prior art, by proposing a method for cleaning a protective device that allows effective automatic cleaning of an optical element arranged upstream of the optic of the optical sensor forming the driver assist system and that is simple to implement without requiring the motor vehicle to be moved.

A further aim of the present invention is to propose a driver assist system having means for detecting dirt, in particular stubborn or encrusted dirt, deposited on a rotating optical element arranged upstream of the optic of the optical sensor of the driver assist system.

Therefore, the aim of the present invention is a method for cleaning a protective device for a driver assist system for a motor vehicle, said driver assist system comprising an optical sensor, the optical sensor having an optic, and the protective device having an optical element arranged upstream of the optic, said optical element having an inner surface arranged facing the optic and an outer surface opposite the inner surface and being movably mounted about an axis of rotation, the method comprises the following steps:

processing a succession of images acquired by the optical sensor when the optical element is rotating, so as to detect a general circular or semi-circular shape on the acquired images that is centered on the axis of rotation of the optical element and is generated by dirt deposited on the outer surface of the optical element; and triggering at least one action for cleaning the outer surface of the optical element if said shape is detected.

Detecting a circular or semi-circular shape centered on the axis of rotation of the optical element allows the presence of any dirt to be detected. The images acquired by the optical sensor that allow the general circular or semi-circular shape to be detected are acquired both when the motor vehicle is moving and when it is stationary. Indeed, it is unlikely that the optical sensor will acquire images with such a shape unless any dirt is present on the outer surface of the optical element of the protective device. It has been found that it is rare that objects with rotational symmetry, the center of which is coincident with the axis of rotation of the optical element, are present in the road scenes generally acquired by an optical sensor.

Furthermore, the detection of this shape that triggers at least one cleaning action allows the driver assist system to exhibit good operability by removing this dirt as soon as it is detected.

The cleaning method according to the present invention can further comprise one or more of the following features taken individually or in combination.

The method comprises a step of the optical sensor acquiring a succession of images prior to the processing step, said acquisition step being able to be carried out when the motor vehicle is moving or stationary.

The step of processing a succession of images is implemented using image processing means of the driver assist system.

The step of processing a succession of images comprises at least one sequence from among a sequence for detecting the luminance of each pixel of each image acquired by the optical sensor, a sequence for detecting at least one dark zone on each pixel of each image acquired by the optical sensor, or a sequence for comparing the succession of images acquired by the optical sensor with each other.

According to one aspect, the optical element is set into rotation when the motor vehicle is started.

According to another aspect, the optical element is set into rotation as soon as the optical sensor is triggered.

The cleaning method is implemented when the motor vehicle is moving or stationary.

According to a particular embodiment, at least the step of processing a succession of images is repeated after the step of triggering the at least one cleaning action.

According to a first embodiment, the at least one cleaning action is implemented when the optical element is fixed.

According to a second embodiment, the at least one cleaning action is implemented when the optical element is rotating.

According to a particular embodiment, the at least one cleaning action is selected from among an action for modifying the speed of rotation of the optical element, an action for spraying a cleaning fluid, such as a cleaning liquid or compressed air, an action for stopping the rotation of the optical element and an action for passing a wiper component, such as a wiper blade, over the outer surface of the optical element, or even a combination of these actions.

Optionally, the cleaning method comprises a drying step, during which the optical element is set into rotation.

The drying step is implemented during a dwell time, for example, of less than three seconds.

The present invention also relates to a driver assist system for a motor vehicle comprising an optical sensor having an optic and configured to acquire at least one image, and a protective device for the optical sensor, the protective device comprising:
　an optical element arranged upstream of the optic of the optical sensor and being movably mounted about an axis of rotation, said optical element having an inner surface arranged facing the optic and an outer surface opposite the inner surface; and
　an actuator configured to rotate the optical element;
the driver assist system comprising:
　image processing means configured to process a succession of images acquired by the optical sensor when the optical element is rotating, so as to detect a general circular or semicircular shape centered on the axis of rotation of the optical element that is generated by dirt deposited on the outer surface of the optical element; and
　at least one electronic control unit configured to communicate with the image processing means, and to trigger at least one action for cleaning the outer surface of the optical element when said shape is detected by the image processing means.

The driver assist system thus allows the previously described cleaning method to be implemented.

The driver assist system can further comprise one or more of the following features taken individually or in combination.

The image processing means are configured to send at least one signal representing the presence of said shape to the at least one electronic control unit so as to allow the at least one action for cleaning the outer surface of the optical element to be triggered when said shape is detected.

According to a first alternative embodiment, the optical sensor comprises the image processing means.

According to a second alternative embodiment, the image processing means are integrated in the electronic control unit.

According to a first aspect, the image processing means are configured to implement a sequence for detecting the luminance of each pixel of each image acquired by the optical sensor or a sequence for detecting at least one dark zone on each pixel of each image acquired by the optical sensor in order to detect said shape.

According to this first aspect, the image processing means are configured to implement an algorithm for executing the one or more detection sequence(s).

According to a second aspect, the image processing means are configured to implement a sequence for comparing the succession of images acquired by the optical sensor with each other in order to detect said shape.

According to a first embodiment, the electronic control unit configured to trigger the at least one cleaning action is configured to control the actuator for rotating the optical element.

According to a second embodiment, the driver assist system comprises at least one first electronic control unit and an additional electronic control unit, the first electronic control unit being configured to control the actuator for rotating the optical element and the additional electronic control unit being configured to trigger the at least one cleaning action.

According to a particular embodiment, the at least one electronic control unit configured to control the actuator is configured to command a change in the speed of rotation of the optical element, so as to carry out the at least one cleaning action.

According to another particular embodiment, the driver assist system further comprises at least one spray nozzle configured to spray a cleaning fluid onto the outer surface of the optical element when the at least one cleaning action is triggered.

The spray nozzle is controlled by the at least one electronic control unit configured to trigger the at least one cleaning action.

According to one aspect, the spray nozzle is connected to a compressor in order to spray compressed air onto the outer surface of the optical element.

According to another aspect, the spray nozzle is connected to a cleaning fluid reservoir in order to spray cleaning liquid onto the outer surface of the optical element.

According to another particular embodiment, the driver assist system further comprises at least one wiper component, such as a wiper blade, configured to sweep the outer surface of the optical element so as to wipe this outer surface.

The wiper component is controlled by the at least one electronic control unit.

According to a specific embodiment, the driver assist system comprises a first electronic control unit configured to control the actuator and an electronic control unit per wiper component for implementing the at least one cleaning action.

Further advantages and features of the present invention will become more clearly apparent upon reading the following description, which is provided by way of a non-limiting illustration, and the accompanying drawings, in which.

In these figures, identical elements carry the same numerical references.

Figure 1:
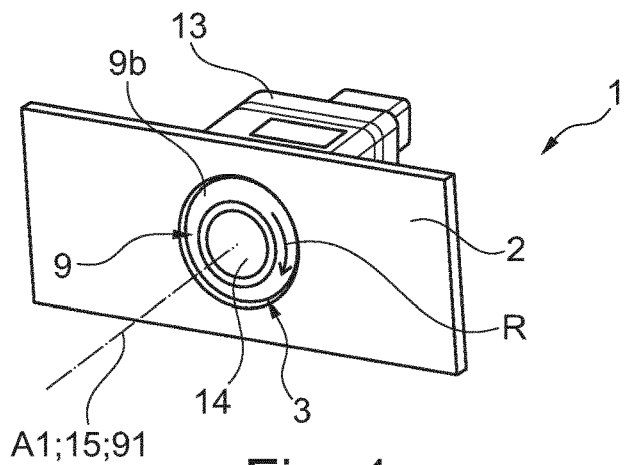
FIG. 1 is a schematic perspective representation of a driver assist system.

The following embodiments are examples. Although the description refers to one or more embodiments, this does not necessarily mean that each reference relates to the same embodiment, or that the features apply to just one embodiment. Simple features of various embodiments also can be combined or interchanged in order to provide other embodiments.

Throughout the following description, reference is made to a first electronic control unit and to an additional electronic control unit, and to a first and a second cleaning action. The index is simply used to differentiate and denote elements that are similar but not identical. This indexing does not imply that one element takes priority over another and such denominations can easily be interchanged without departing from the scope of the present description. This indexing also does not imply a time order, for example, in order to assess the implementation of the method for cleaning the optical sensor protective device, or even in order to assess the arrangement of the various elements composing the driver assist system.

With reference to FIGS. 1 to 6, the invention relates to a driver assist system 1 for a motor vehicle.

In the following description, the expression "front of the motor vehicle" corresponds to the face of the motor vehicle that is exposed to the airflow during the normal operation of the motor vehicle, this is in particular the face having the headlamps. In contrast, the term "back of the motor vehicle" is understood to mean the face of the motor vehicle opposite the front face.

Furthermore, "upstream" is defined in the following description as the direction of the light rays, i.e., from the outside to the inside of an optical sensor 13 of the driver assist system 1. A first element arranged upstream of a second element is then located before the second element in the direction of propagation of the light rays inside the optical sensor 13. Similarly, "downstream" in the following description is also defined according to the direction of propagation of the light rays inside the optical sensor 13. Thus, a first element arranged downstream of a second element is then located after the second element in the direction of propagation of the light rays inside the optical sensor 13.

Furthermore, "dirt" in the following description is understood to mean water droplets or traces of water present on an optical element 9 upstream of the optical sensor 13, or even organic pollutants such as insects, for example, or mineral pollutants such as mud, for example, or even a combination of these various elements.

Moreover, "luminance" in the following description is understood to mean a value corresponding to the visual sensation of luminosity of a surface. More specifically, the luminance corresponds to the power of the visible light passing through or being emitted at a point of a surface and in a given direction per unit of surface and per unit of solid angle.

Next, "transparent" in the following description is understood to mean a light-transmitting material through which objects are clearly visible, in particular objects arranged outside the motor vehicle and the image of which is captured by the optical sensor 13. In particular, a transparent material in the following description may be coloured or colourless.

Figure 2:
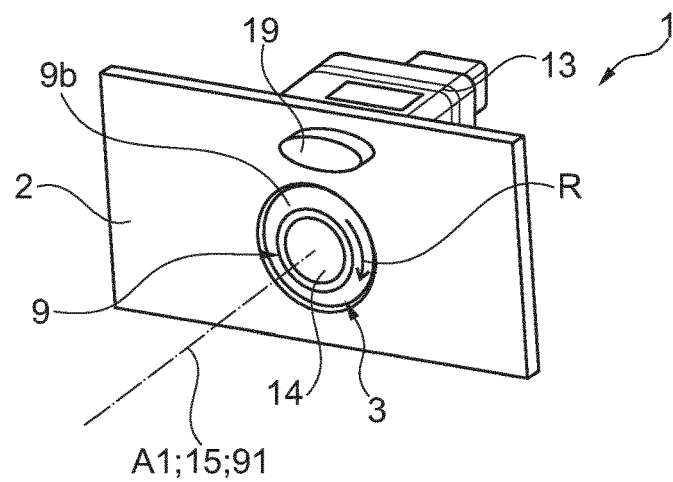
FIG. 2 is a schematic perspective representation of a driver assist system according to a particular embodiment.
Figure 3:
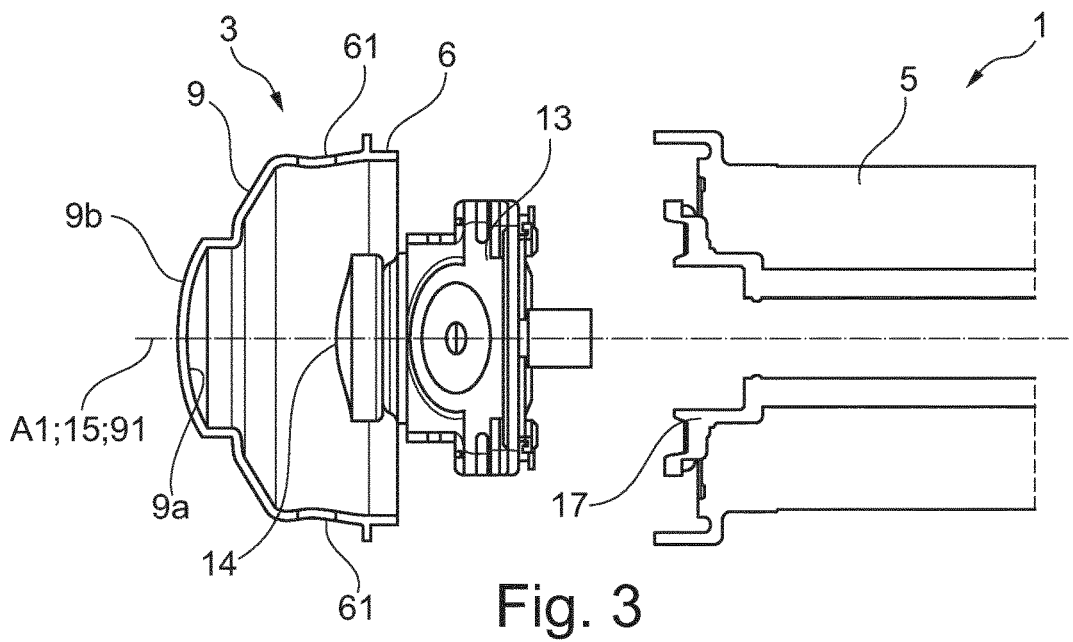
FIG. 3 is a schematic representation of an exploded view of a partial section of the driver assist system of FIG. 1.

With reference to FIGS. 1 to 3, embodiments of the driver assist system 1 for a motor vehicle are shown. The driver assist system 1 comprises the optical sensor 13 and a protective device 3 for the optical sensor 13.

The optical sensor 13 may for example be an image-capturing optical sensor 13 such as a camera. For example, it can be a CCD (Charged Coupled Device) sensor or a CMOS sensor comprising a matrix of miniature photodiodes. According to another alternative embodiment, it can be a sensor for remote laser sensing, known as a LIDAR (Light Detection And Ranging) sensor. Thus, the optical sensor 13 is configured to acquire at least one image.

The optical sensor 13 includes an optic 14 having an optical axis 15. The optic 14 may for example be an objective. An objective may include at least one lens, and in particular, depending on the field of view and the resolution of the optical sensor 13, a plurality of lenses, for example between two and ten lenses, generally four or five lenses, or even ten lenses in the case of a fish-eye 14. At least one of the lenses of the optic 14 is convex (domed), for example, with convexity oriented toward the outside of the optical sensor 13, for example, for a "fisheye" lens.

In addition, a support 17 (shown in FIG. 3) for the optical sensor 13 can be provided. This holder 17 is arranged behind the optical sensor 13 on the side opposite to the optic 14. According to the embodiments shown with reference to FIGS. 1 to 3, the optical sensor 13 and the support 17 are intended to be fixedly mounted in the protective device 3.

The driver-assistance system 1 may be mounted at the front of the motor vehicle level with a bumper for example. As a variant, the driver-assistance system 1 may be installed at the rear of the motor vehicle, for example level with the bumper or number plate. According to yet another alternative embodiment, the driver assist system can be mounted on the sides of the motor vehicle, on the rear-view mirrors, for example.

The driver assist system 1, and more specifically the protective device 3, can be fixed to any element of the motor vehicle using any technique known to a person skilled in the art. According to the embodiment of FIGS. 1 and 2, the driver assist system 1 is installed in a bodywork element 2, such as, for example, a bumper having an opening through which at least the optic 14 of the optical sensor 13 projects.

With reference to FIGS. 1 to 3, the protective device 3 comprises an optical element 9 movably mounted about an axis of rotation A1 and an actuator 5 configured to rotate the optical element 9, such as a motor, for example. The optical element 9 is arranged upstream of the optic 14 of the optical sensor 13. Thus, the optical element 9 also projects from the bodywork element 2, as shown with reference to FIGS. 1 and 2, in the state whereby the driver assist system 1 is mounted on the motor vehicle. More specifically, the optical element 9 has an inner surface 9a arranged facing the optic 14 and an outer surface 9b opposite the inner surface 9a. The optical element 9 is therefore intended to protect the optic 14 of the optical sensor 13 from any dirt spray or solid debris that could damage this optic 14. Therefore, it is a protective element, or more specifically a protective mask for the optical sensor 13, and it is this optical element 9 that is subjected to the attacks from outside, i.e., equally to spray from water, pollutants, stone chips, as well as deposits of pollutants or traces of water.

Moreover, rotating the optical element 9 about the axis of rotation A1 allows any dirt to be removed from the outer surface 9b by the centrifugal effect. According to the particular embodiment of FIG. 3, the optical element 9 is separate from the optical sensor 13. According to an alternative embodiment, not shown herein, the optical element 9 can be a component of the optic 14, and in particular an outer lens of the optic 14.

The optical element 9 is designed so as to cover at least the entire surface of the optic 14. The optical element 9 is therefore arranged in the field of view of the optical sensor 13. To this end, the optical element 9 is transparent so as not to impair the operability of the optical sensor 13. This optical element 9 may be made of glass or of a transparent plastic such as polycarbonate, for example.

Moreover, the outer surface 9b of the optical element 9 can have one or more of the following properties: hydrophobic, infrared filter, photocatalytic, super hydrophobic, lipophobic, hydrophilic, super hydrophilic, stone chip resistant, or even any other surface treatment for reducing dirt adhesion. In particular, by virtue of the hydrophobic properties of the outer surface 9b of the optical element 9, any water droplets run off the outer surface 9b of the optical element 9 without leaving traces since the water will not be able to adhere to this outer surface 9b. This thus allows the presence of traces of water on the optical element 9 to be limited that could impair the correct operation of the driver assist system 1, and in particular the quality of the images acquired by the optical sensor 13. Additionally, depending on the surface treatment of the outer surface 9b, the possibility for organic or inorganic pollutants to adhere to this outer surface 9b may be limited, thereby also contributing to the correct operation of the driver-assistance system 1. Moreover, the optical element 9 has an optical axis 91 that is coincident with the axis of rotation A1 of the optical element 9. Furthermore, according to the embodiment of FIGS. 1 to 3, the optical axis 15 of the optical sensor 13 and the axis of rotation A1 of the optical element 9 are also coincident.

According to the embodiment illustrated with reference to FIG. 3, the protective device 3 can further comprise a housing 6 configured to at least partially accommodate the optical sensor 13. The housing 6 and the optical element 9 form a single piece according to this particular embodiment. According to another embodiment, not shown herein, the housing 6 and the optical element 9 can be two separate parts that are joined together. The housing 6 is arranged so as to be rotated by the actuator 5, which results in the optical element 9 being rotated in order to remove any dirt present on the outer surface 9b of the optical element 9 by the centrifugal effect. Moreover, the housing 6 can be a sealed housing made of any suitable material known to a person skilled in the art. Moreover, the housing 6 can have anti-condensation means such as at least one through hole 61 in the housing 6 made by perforating, for example, and preferably having one or more semi-permeable membrane(s) (not shown), for example. In such a case, means for compensating for the loss of mass potentially caused by such an aperture may be provided so as not to unbalance the rotation of the optical element 9.

The actuator 5 is configured, for example, to rotate the housing 6 at a speed ranging between 1,000 and 50,000 rpm, preferably between 5,000 and 20,000 rpm, and even more preferably between 7,000 and 15,000 rpm. Such speeds of rotation allow most of the dirt that could have been deposited on the outer surface of the optical element 9 to be removed by the centrifugal effect.

Figure 4:
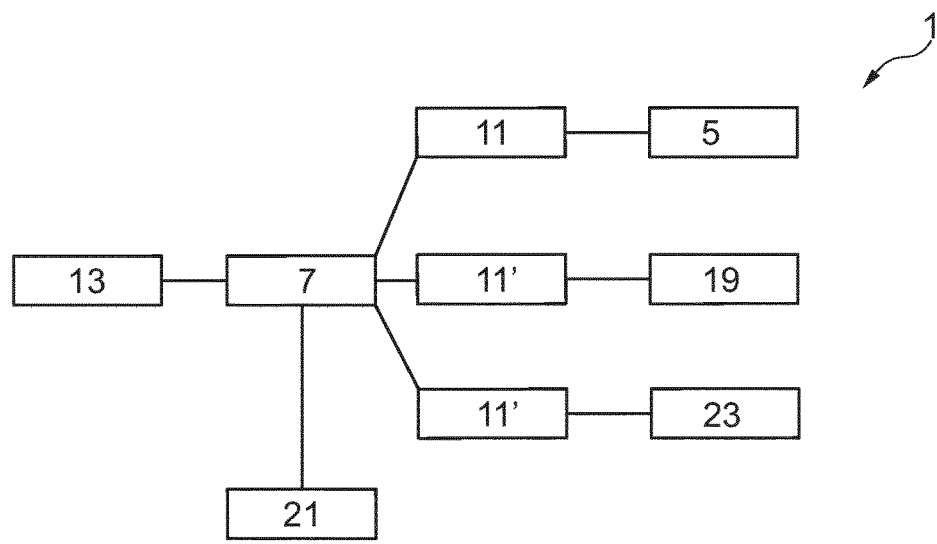
FIG. 4 is a block diagram of the operation of the driver assist system of FIG. 1 according to a first alternative embodiment.
Figure 5:
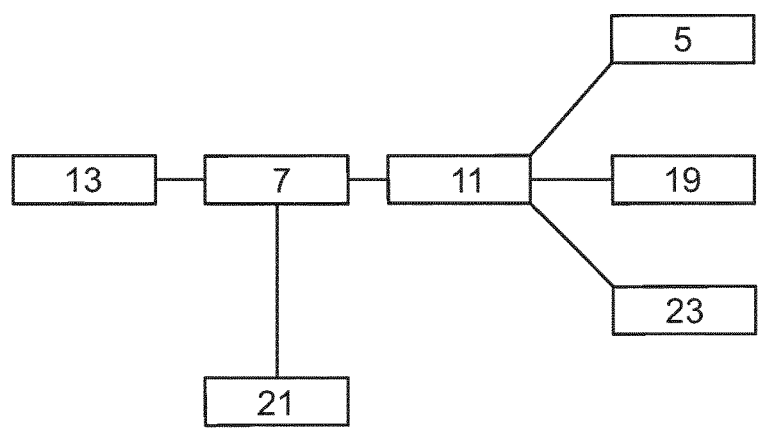
FIG. 5 is a block diagram of the operation of the driver assist system of FIG. 1 according to a second alternative embodiment.
Figure 6:
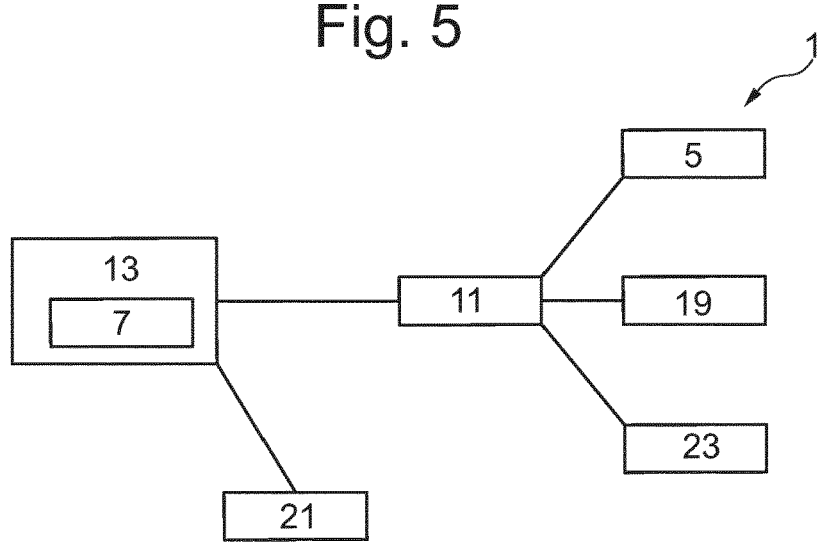
FIG. 6 is a block diagram of the operation of the driver assist system of FIG. 1 according to a third alternative embodiment.

In order to detect dirt, in particular encrusted or stubborn dirt, due to prolonged parking of the motor vehicle, for example, on the outer surface 9b of the optical element 9, where the location of the dirt means that it is difficult to remove by the centrifugal effect, the driver assist system 1 further comprises image processing means 7 and at least one electronic control unit 11, as shown with reference to FIGS. 4 to 6.

The image processing means 7 are configured to process a succession of images acquired by the optical sensor 13 when the optical element 9 is rotating. More specifically, the image processing means 7 are configured to detect a general circular or semi-circular shape 8 (schematically shown in FIG. 8A) centered on the axis of rotation A1 of the optical element 9. As a result of the rotation of the optical element 9, if any dirt is present on the outer surface 9b of the optical element 9, it will result in this circular or semi-circular shape 8. In other words, such a general circular or semi-circular shape centered on the axis of rotation A1 of the optical element 9 is generated by dirt deposited on the outer surface 9b of the optical element 9. In the images acquired by the optical sensor 13, it has been found that detecting such shapes on the images acquired by the optical sensor 13 in the case whereby no dirt is present on the outer surface 9b of the optical element 9 is unlikely. Indeed, objects with rotational symmetry centered on the axis of rotation A1 of the optical element 9 are rare in the road scenes that are acquired by the optical sensor 13. Thus, the detection of dirt in the field of view of the optical sensor 13 is improved. Furthermore, the images acquired by the optical sensor 13 that are analyzed by the processing means 7 for detecting such a shape can be acquired both when the motor vehicle is moving or stationary.

With reference to FIGS. 4 to 6 and 8A, 8B, according to a first embodiment, the image processing means 7 can be configured to implement a sequence for detecting the luminance of each pixel of each image acquired by the optical sensor 13 or a sequence for detecting at least one dark zone on each pixel of each image acquired by the optical sensor 13 in order to detect said shape 8. Thus, even traces of hardly visible or even colorless dirt, such as, for example, organic residues from insects, can be detected by the image processing means 7. More specifically, the image processing means 7 are configured to implement an algorithm for executing the one or more detection sequence(s).

Indeed, even when shadows are present in the images acquired by the optical sensor 13, the luminance on the various pixels of the acquired images is generally the same or almost the same. A significant reduction in luminance on some zones of the images acquired by the optical sensor 13 can therefore indicate the presence of stubborn dirt on the outer surface 9b of the optical element 9. Even in the case of colorless dirt, this can diffract light and therefore cause a reduction in luminance on some zones of the images acquired by the optical sensor 13. Moreover, if the reduction in detected luminance, or even the dark zone, has the general circular or semi-circular shape 8 centered on the axis of rotation A1 of the optical element 9, this indicates the presence of any dirt. As previously stated, detecting this shape 8 indicates the presence of any dirt. As an alternative embodiment or in addition, the image processing means 7 can be configured to implement a sequence for comparing the succession of images acquired by the optical sensor 13 with each other in order to detect said shape 8.

The dirt detected by the image processing means 7 is on the outer surface 9b of the optical element 9 of the protective device 3 (by also referring to FIGS. 1 to 3).

Furthermore, in order to transmit the images acquired by the optical sensor 13 to a user of the motor vehicle, the image processing means 7 can be connected to at least one display component such as a screen 21 (schematically shown in FIGS. 4 to 6) configured to display the images acquired by the optical sensor 13. This screen 21 can be arranged inside the passenger compartment of the motor vehicle, such as, for example, on a central console.

Moreover, the at least one electronic control unit 11 is configured to communicate with the image processing means 7 and to trigger at least one action for cleaning the outer surface 9b of the optical element 9 when said shape 8 is detected by the image processing means 7.

More specifically, the image processing means 7 are configured to send at least one signal representing the presence of said shape 8 to the at least one electronic control unit 11 so as to allow the at least one action for cleaning the outer surface 9b of the optical element 9 to be triggered when said shape 8 is detected.

FIGS. 4 to 6 show block diagrams of the operation of the driver assist system 1 according to various embodiments, and in particular of the cleaning of the outer surface 9b of the optical element 9.

The image processing means 7 are connected to at least one electronic control unit 11. The one or more electronic control unit(s) 11 is/are configured to trigger one or more cleaning action(s). Furthermore, the same unit or another electronic control unit 11 can be configured to control the actuator 5 in order to rotate the optical element 9 (shown in FIGS. 1 to 3).

By way of a non-limiting example, the electronic control unit 11 can command a variation of the speed of rotation of the optical element 9 in order to carry out a cleaning action. More specifically, it can control accelerations and decelerations of the optical element 9 in order to facilitate the loss of adhesion of any dirt. Advantageously, it is the same electronic control unit 11 configured to control the actuator 5 that is configured to command a change in the speed of rotation of the optical element 9.

Moreover, a cleaning action can also involve spraying a cleaning fluid, such as compressed air or a cleaning liquid, onto the outer surface 9b of the optical element 9. To this end, the bodywork element 2 has an opening to allow the passage of a spray nozzle 19 of the driver assist system 1 (as schematically shown in FIG. 2) and the electronic control unit 11 controls the spray nozzle 19 in order to trigger such a cleaning action. According to a particular embodiment, when the cleaning action corresponds to compressed air being sprayed onto the outer surface 9b of the optical element 9, the spray nozzle 19 can be connected to a compressor (not shown) in order to spray compressed air onto this outer surface 9b. According to another embodiment, when the cleaning action corresponds to cleaning liquid being sprayed, the spray nozzle 19 can be connected to a cleaning liquid reservoir (not shown), such as, for example, a windshield washer liquid reservoir of the motor vehicle, in order to spray cleaning liquid onto the outer surface 9b of the optical element 9.

According to another alternative embodiment, a cleaning action can involve stopping the rotation of the optical element 9 combined with the passage of a wiper component 23, such as a wiper blade, for example, in order to remove any dirt from the outer surface 9b by a mechanical action, and, more specifically, by sweeping the outer surface 9b of the optical element 9. As for the various other cleaning actions, the wiper component 23 is controlled by the at least one electronic control unit 11. Moreover, these various cleaning actions optionally can be combined, as is described in further detail hereafter.

The driver assist system 1 can comprise a single electronic control unit 11 configured to command the actuator 5 in order to rotate the optical element 9 and to implement one or more cleaning action(s). Alternatively, the driver assist system 1 can comprise a first electronic control unit 11 particularly configured to control the actuator in order to rotate the optical element 9 and one or more other electronic control unit(s) 11' configured to implement a cleaning action. For example, the first electronic control unit 11 can be configured to control the actuator in order to rotate the optical element 9 and to modify this speed of rotation when such a cleaning action is implemented, and at least one additional electronic control unit 11' is configured, for example, to implement a cleaning action corresponding to a cleaning fluid being sprayed onto the outer surface 9b of the optical element 9, or even to the passage of the wiper component 23.

According to a first alternative embodiment (FIG. 4), the driver assist system 1 comprises at least one first electronic control unit 11 and an additional electronic control unit 11', and, more specifically, two additional electronic control units 11'. The first electronic control unit 11 is configured to control the actuator 5 for rotating the optical element 9, and the additional electronic control units 11' are each configured to trigger at least one cleaning action, namely spraying a cleaning fluid or stopping the rotation of the optical element 9 in order to command the passage of the wiper component 23 over the outer surface 9b thereof, or even a modification of the speed of rotation of the optical element 9. Alternatively, two cleaning actions can be combined, and in particular the spraying of a cleaning liquid and the passage of the wiper component 23. Thus, the driver assist system 1 comprises a first electronic control unit 11 configured to control the actuator 5 and an additional electronic control unit 11' per cleaning component allowing the at least one cleaning action to be implemented. The image processing means 7 can be configured to notify the additional electronic control units 11' of the presence of the general circular or semi-circular shape 8 centered on the axis of rotation A1 of the optical element 9 in order to allow a first cleaning action to be implemented, such as, for example, spraying cleaning fluid, and then optionally to allow a second cleaning action to be implemented if necessary.

According to a second alternative embodiment (FIG. 5), the same electronic control unit 11 is configured to trigger one or more cleaning actions and to control the actuator 5 for rotating the optical element 9. Thus, the driver assist system 1 can comprise a limited number, or even a single electronic control unit 11, which allows the number of components of the driver assist system 1 to be limited and therefore allows its size and cost to be limited compared to the first alternative embodiment described with reference to FIG. 4.

According to these first (FIG. 4) and second (FIG. 5) alternative embodiments, the at least one electronic control unit 11, the image processing means 7 and the optical sensor 13 are separate elements.

According to a third alternative embodiment (FIG. 6), the optical sensor 13 comprises the image processing means 7. The optical sensor 13 is connected to the electronic control unit 11 or to the various electronic control units 11, 11' as described with reference to FIG. 4. More specifically, the optical sensor 13 is adapted to send signals to the unit or to each electronic control unit 11, in particular without additional intermediate image processing means 7, as shown with reference to FIGS. 4 and 5. The optical sensor 13 also can be connected to the screen 21. This can involve a direct communication, i.e., the optical sensor 13 transmits the acquired images to the screen 21 without passing through additional image processing means, as shown with reference to FIGS. 4 and 5.

According to this third alternative embodiment, the driver assist system 1 comprises a single electronic control unit 11 for controlling the actuator 5 in order to rotate the optical element 9 and optionally to ensure the at least one cleaning action when this involves a modification of the speed of rotation of the optical element 9 and also for controlling the spray nozzle 19 or the wiper component 23 when the driver assist system 1 comprises such elements.

According to an alternative embodiment not shown herein, the driver assist system 1 can comprise the image processing means 7 integrated in the optical sensor 13 and the first electronic control unit 11 configured to control the rotation of the optical element 9 and at least one additional electronic control unit 11' configured to control the at least one cleaning action.

The use of an optical sensor 13 comprising the image processing means 7 allows the number of components of the driver assist system 1, and therefore its size, to be limited. Indeed, additional image processing means do not need to be provided other than those already embedded in the optical sensor 13.

According to another alternative embodiment not shown herein, the driver assist system 1 comprises a single electronic control unit 11, in which the image processing means 7 are integrated. Thus, additional image processing means 7 that communicate with both the optical sensor 13 and the electronic control unit 11 are not needed in order to control the one or more cleaning action(s). According to this other alternative embodiment, the electronic control unit 11 is configured to control the speed of rotation of the optical element 9 and also to control one or more cleaning action(s).

Furthermore, according to this other alternative embodiment, the electronic control unit 11 can be connected to the screen 21 in order to transmit the images acquired by the optical sensor 13 to the user of the motor vehicle when necessary, such as, for example, during a maneuver for parking the motor vehicle.

Figure 7:
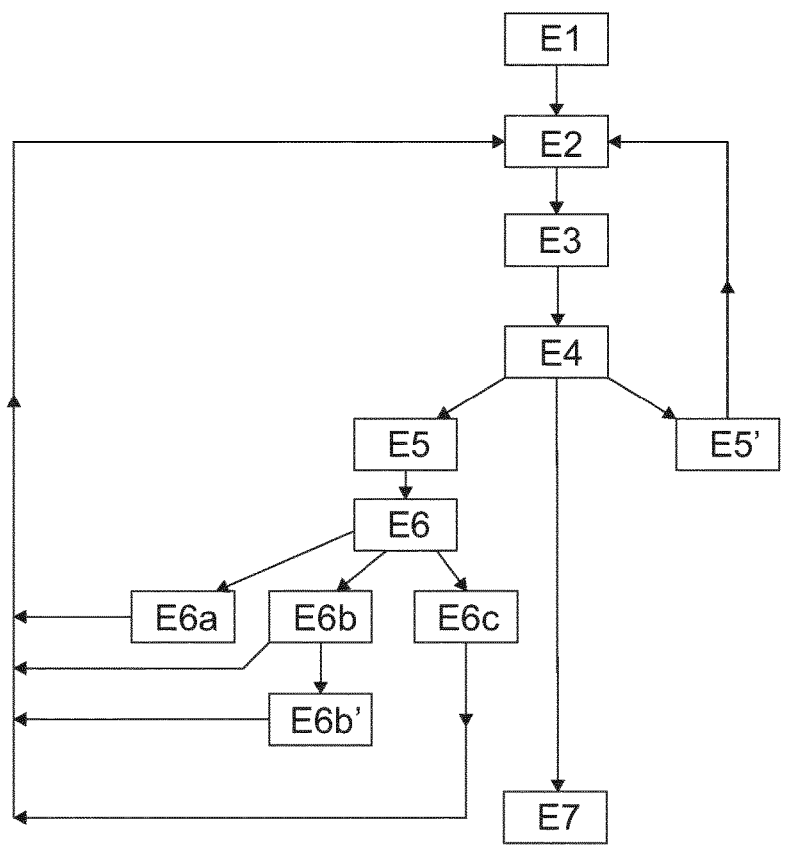
FIG. 7 is a flowchart showing a method for cleaning a protective device for the driver assist system of FIG. 1.

With reference to FIG. 7, a flow chart is shown illustrating the operation of the previously described driver assist system 1, and, more specifically, a method for cleaning the protective device 3 of the optical sensor 13, and in particular the optical element 9.

The method comprises a step E1 of starting the rotation of the optical element 9 in order to remove any dirt, such as, for example, dust, which can be deposited thereon, by the centrifugal effect. This step E1 of starting the rotation can be carried out when the motor vehicle is started or as soon as the optical sensor 13 is triggered. The optical element 9 is set into rotation by the actuator 5 (see FIG. 3). Furthermore, at least during the operation of the driver assist system 1, the optical element 9 is kept rotating so as to remove any water droplets or dirt that might be deposited thereon by the centrifugal effect in order to guarantee the quality of the images acquired by the optical sensor 13 (particularly shown in FIGS. 1 to 3) and therefore to guarantee correct operability of the driver assist system 1.

The method comprises a step E2 of the optical sensor 13 acquiring a succession of images. This step E2 of the optical sensor 13 acquiring images can be carried out both when the vehicle is moving or when it is stationary.

The method then comprises a step E3 of processing the succession of images acquired by the optical sensor 13 when the optical element 9 is rotating in order to detect the general circular or semi-circular shape 8 (shown in FIG. 8A) on the acquired images that is centered on the axis of rotation A1 of the optical element 9. Detecting such a shape 8 on the images acquired by the optical sensor 13, even when the motor vehicle is stationary, allows the presence of dirt on the outer surface 9b of the optical element 9 to be identified since it has been found that it is unlikely that such shapes will be detected when there is no dirt on this outer surface 9b.

The step E3 of processing a succession of images is implemented using image processing means 7 of the driver assist system 1. As previously stated, the image processing means 7 can be included in the electronics of the optical sensor 13, as shown with reference to FIG. 6, or in the at least one electronic control unit 11 of the driver assist system 1, or they even can be separate from the optical sensor 13 and the electronic control unit 11, as shown with reference to FIGS. 4 and 5.

The step E3 of processing the succession of images can comprise at least one sequence from among a sequence for detecting luminance or dark zones or even a sequence for mutually comparing images acquired by the optical sensor 13 during step E2, as previously described.

After this step E3 of processing a succession of images, the method can comprise a step E4 of sending a signal to the at least one electronic control unit 11 indicating the absence (step E5') or the presence (step E5) of the general circular or semi-circular shape 8 centered on the axis of rotation A1 of the optical element 9.

Figure 8A:
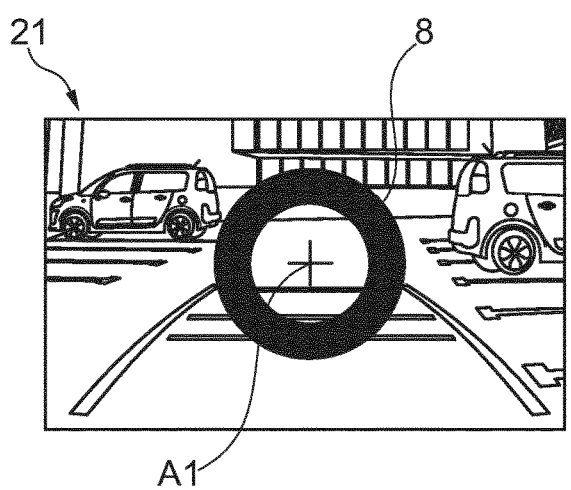
FIG. 8A is a schematic representation of an image acquired by an optical sensor of the driver assist system showing dirt on a protective device upstream of the optical sensor.
Figure 8B:
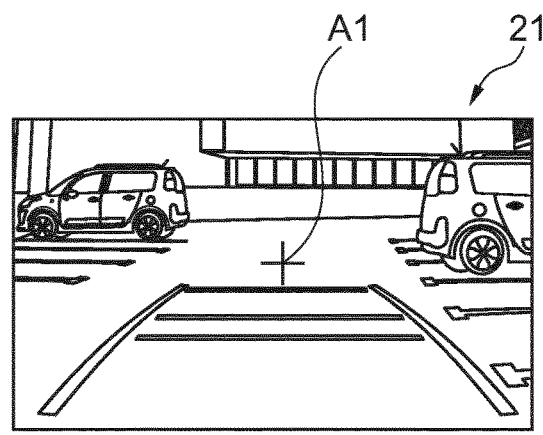
FIG. 8B is a schematic representation of the image acquired in FIG. 8A, showing no dirt on the protective device.

Irrespective of the result of step E3 of processing a succession of images, the various images acquired by the optical sensor 13 can be transmitted to the occupant of the motor vehicle during a step E7 of displaying the acquired images. In particular, these acquired images are displayed on the screen 21 (schematically shown in FIGS. 4 to 6)

arranged inside the passenger compartment of the motor vehicle, for example, as shown with reference to FIGS. 8A and 8B. More specifically, FIG. 8A corresponds to an image acquired by the optical sensor 13 having the general circular or semi-circular shape 8 centered on the axis of rotation A1 of the optical element 9 reflecting the presence of any dirt. Furthermore, FIG. 8B corresponds to an image without any dirt. Thus, FIG. 8A corresponds to the image displayed on the screen 21 when the electronic control unit 11 is notified of the presence of dirt (step E5) on the outer surface 9b of the optical element 9, and FIG. 8B corresponds to the image displayed on the screen 21 when the electronic control unit 11 is notified of the absence of dirt (step E5') on the outer surface 9b of the optical element 9. The implementation of the cleaning method does not impair the use of the driver assist system 1 if it is needed by the motor vehicle user.

Upon receipt of the signal representing the presence of the general circular or semi-circular shape 8, for example, by the electronic control unit 11, the method implements a step E6 of triggering at least one action for cleaning the outer surface 9b of the optical element 9. In other words, detecting the general circular or semi-circular shape 8 during step E5 allows the cleaning step E6 to be triggered automatically. Thus, the operability conditions of the optical sensor 13 are improved because the outer surface 9b of the optical element 9 is cleaned as soon as the general circular or semi-circular shape 8 is detected, in order to clean the outer surface 9b of the optical element 9 prior to the possible display of the images acquired by the optical sensor 13 on the screen 21.

As previously stated, the cleaning action can be an action, for example, for modifying the speed of rotation E6a of the optical element 9. This modification of the speed of rotation E6a of the optical element 9 can correspond to an acceleration of this speed of rotation, or even to acceleration and deceleration phases thereof in order to allow any dirt on the outer surface 9b of the optical element 9 to lose adhesion so that it can be removed. These acceleration and deceleration phases optionally can correspond to a rapid variation in the direction of rotation of the optical element 9.

As an alternative embodiment or additionally, the cleaning action can involve, for example, spraying E6b a cleaning fluid. This spraying step E6b can be implemented both when the optical element 9 is fixed or rotating.

More specifically, and optionally according to the particular embodiment shown with reference to FIG. 7, when the cleaning action corresponds to the step E6b of spraying cleaning fluid, the method advantageously comprises a drying step E6b', during which the optical element 9 is set into rotation. This can occur, for example, between the cleaning action or actions E6 and a new iteration of the step E2 of acquiring a succession of images. This drying step E6b' allows the cleaning liquid that is used, and optionally the dirt that may have deposited on the optical element 9, to be removed immediately after the cleaning action.

Furthermore, a drying step E6b' also can be implemented to allow any spray of a liquid such as, for example, water, melted snow, or even hydrocarbons on the outer surface 9b of the optical element 9 to be removed, in particular immediately after the cleaning action. This avoids detecting traces that do not correspond to stubborn or encrusted dirt. However, according to other embodiments not described herein, this drying step E6b' can be implemented for a duration of more than 3 seconds. However, according to other embodiments not described herein, this drying step E6b' can be implemented for a duration of more than 3 seconds.

According to yet another alternative embodiment, or in addition, the cleaning action can comprise an action for stopping the rotation of the optical element combined with an action E6c for passing a wiper component 23 (shown in FIG. 6) over the outer surface 9b of the optical element 9.

A combination of these various cleaning actions can be implemented. Depending on the cleaning action that is implemented, this action can be carried out when the optical element 9 is fixed or rotating, in particular when it involves spraying a cleaning fluid, making the implementation of the cleaning method versatile.

Furthermore, at least the steps E2 of acquiring a succession of images and of processing E3 this succession of acquired images are repeated after the step of triggering the at least one cleaning action E6. Thus, it is possible to check the effectiveness of the cleaning and optionally to launch an additional step E6 of triggering the at least one cleaning action in order to remove any dirt that still may be present on the outer surface 9b of the optical element 9.

In the event that the general circular or semi-circular shape 8 is no longer detected by the image processing means 7, the step E6 of triggering the at least one cleaning action does not need to be repeated. The result of step E4 of sending the signal to the at least one electronic control unit 11 will correspond to the absence of detecting said shape 8 (step E5').

In the event that said shape 8 is still detected by the image processing means 7, step E6 of triggering the at least one cleaning action is repeated so as to carry out a second cleaning cycle. In this case, the cleaning actions can be combined. It is possible to contemplate that the first cleaning action corresponds to step E6a of modifying the speed of rotation of the optical element 9. As the presence of the shape 8 is still detected, this indicates that this cleaning action E6a for modifying the speed of rotation was not enough to remove any dirt. Indeed, this dirt sometimes may need to be moistened, with a cleaning liquid, for example, in order to facilitate its loss of adhesion on the outer surface 9b of the optical element 9 or to initiate the breaking-up thereof in order to facilitate the removal thereof, for example. Thus, the cleaning method can implement, as a second step E6 of triggering the at least one cleaning action, a step E6b of spraying a cleaning fluid, such as, for example, a cleaning liquid, in order to moisten the dirt, then a step E6a of modifying the rotation of the optical element 9 in order to remove the moistened dirt. Alternatively, these steps E6b of spraying a cleaning fluid and of modifying E6a the speed of rotation of the optical element 9 can be implemented together.

According to yet another alternative embodiment, when implementing a second step E6 of triggering the at least one cleaning action is necessary, this triggering step E6 can comprise a first step E6b of spraying cleaning liquid and then the step E6c for passing the wiper component 23 over the outer surface 9b of the optical element 9 when said element is stopped in order to allow mechanical cleaning of this outer surface 9b. Thus, the electronic control unit 11 can jointly or sequentially control a combination of cleaning actions.

In the method described above, reference is made to an electronic control unit 11. This method can be implemented, for example, by the driver assist system 1 shown with reference to FIGS. 5 and 6. As an alternative embodiment, this method can be implemented by a driver assist system 1 comprising a first electronic control unit 11 and one or more additional electronic control unit(s) 11', as shown with reference to FIG. 4.

The cleaning method described above can be implemented when the motor vehicle is moving or stationary. This provides versatility in cleaning the optical element 9 without being limited by the motor vehicle having to move. This thus ensures that the driver assist system 1 can be operated properly when it is required by the user of the motor vehicle.

The aforementioned embodiments are examples that are provided by way of a non-limiting illustration. Indeed, it is entirely possible for a person skilled in the art to use other types of actuator 5 than a motor in order to rotate the optical element 9 without departing from the scope of the present invention. Furthermore, a person skilled in the art can implement cleaning actions other than those described above without departing from the scope of the present invention. Moreover, a person skilled in the art can combine some steps of the cleaning method described above or even can interchange some steps of this cleaning method without departing from the scope of the present invention.

Thus, obtaining a cleaning method for a protective device 3 of an optical sensor 13 for a motor vehicle that allows effective automatic cleaning of an optical element 9 arranged upstream of the optical sensor 13, and that is simple to implement and with a dirt detection step that can be carried out even when the motor vehicle is stationary, is possible by virtue of the previously described driver assist system 1 implementing this cleaning method.

The invention claimed is:

1. A method for cleaning a protective device for a driver assist system of a motor vehicle having an optical element movably mounted about an axis of rotation comprising:
    processing a succession of images acquired by the optical sensor when the optical element is rotating, so as to detect a general circular or semi-circular shape on the acquired images that are centered on the axis of rotation of the optical element generated by dirt deposited on the outer surface of the optical element; and
    triggering at least one action for cleaning the outer surface of the optical element when the general circular or semi-circular shape is detected.

2. The cleaning method as claimed in claim 1, wherein the processing of the succession of images is implemented with the assistance of an image processing means of the driver assist system.

3. The cleaning method of claim 1, wherein processing the succession of images includes at least one sequence from among
    a sequence for detecting the luminance of each pixel of each image acquired by the optical sensor;
    a sequence for detecting at least one dark zone on each pixel of each image acquired by the optical sensor; or
    a sequence for comparing the succession of images acquired by the optical sensor with each other.

4. The cleaning method of claim 1, wherein processing the succession of images is repeated after triggering the at least one cleaning action.

5. The cleaning method of claim 1, wherein the at least one cleaning action is implemented when the optical element is stationary.

6. The cleaning method of claim 1, wherein the at least one cleaning action is implemented when the optical element is rotating.

7. The cleaning method of claim 1, wherein the at least one cleaning action is selected from among:
    an action of modifying the speed of rotation of the optical element;
    an action of spraying a cleaning fluid, such as a cleaning liquid or compressed air;
    an action of stopping the rotation of the optical element;
    an action of passing a wiper component, such as a wiper blade, over the outer surface of the optical element; or
    some combination thereof.

8. The cleaning method of claim 7, further including drying the optical element such as to set the optical element into rotation.

9. A driver assist system for a motor vehicle comprising:
    an optical sensor having an optic that is configured to acquire an image;
    a protective device for the optical sensor, the protective device including an optical element arranged upstream of the optic of the optical sensor;
the protective device being movably mounted about an axis of rotation;
the optical element having an inner surface arranged facing the optic and an outer surface opposite the inner surface, and an actuator configured to rotate the optical element;
the driver assist system including:
    an image processing means configured to process a succession of images acquired by the optical sensor when the optical element is rotating, so as to detect a general circular or semi-circular shape centered on the axis of rotation of the optical element generated by dirt deposited on the outer surface of the optical element; and
    at least one electronic control unit configured to communicate with the image processing means, and to trigger at least one action for cleaning the outer surface of the optical element when said shape is detected by the image processing means.

10. The driver assist system of claim 9, wherein the optical sensor includes the image processing means.

11. The driver assist system of claim 9, wherein the electronic control unit configured to trigger the at least one cleaning action is configured to control the actuator for rotating the optical element.

12. The driver assist system of claim 9, further including at least one spray nozzle configured to spray a cleaning fluid onto the outer surface of the optical element when the at least one cleaning action is triggered.

* * * * *